United States Patent
Jaradi et al.

(10) Patent No.: US 11,180,102 B1
(45) Date of Patent: Nov. 23, 2021

(54) SIDE AIRBAG ASSEMBLY

(71) Applicant: Ford Global Technologies, LLC, Dearborn, MI (US)

(72) Inventors: Dean M. Jaradi, Macomb, MI (US); S. M. Iskander Farooq, Novi, MI (US); Mohammad Omar Faruque, Ann Arbor, MI (US); Cameron Hein, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/991,197

(22) Filed: Aug. 12, 2020

(51) Int. Cl.
| | |
|---|---|
| *B60R 21/0136* | (2006.01) |
| *B60R 21/207* | (2006.01) |
| *B60R 21/2338* | (2011.01) |
| *B60R 21/261* | (2011.01) |
| *B60N 2/14* | (2006.01) |
| *B60R 21/231* | (2011.01) |
| *B60R 21/00* | (2006.01) |
| *B60N 2/20* | (2006.01) |

(52) U.S. Cl.
CPC ........ *B60R 21/0136* (2013.01); *B60R 21/207* (2013.01); *B60R 21/2338* (2013.01); *B60R 21/261* (2013.01); *B60N 2/143* (2013.01); *B60N 2/20* (2013.01); *B60R 2021/0032* (2013.01); *B60R 2021/23107* (2013.01); *B60R 2021/23386* (2013.01); *B60R 2021/2615* (2013.01)

(58) Field of Classification Search
CPC ............ B60R 21/0136; B60R 21/2338; B60R 21/207; B60R 21/261; B60R 2021/23107; B60R 2021/2615; B60R 2021/23386; B60R 2021/0032; B60N 2/20; B60N 2/143
See application file for complete search history.

(56) References Cited

U.S. PATENT DOCUMENTS

| | | | | |
|---|---|---|---|---|
| 5,967,603 | A * | 10/1999 | Genders | B60R 21/207 280/730.2 |
| 9,102,300 | B2 * | 8/2015 | Faruque | B60R 21/207 |
| 10,252,693 | B2 * | 4/2019 | Numazawa | B60N 2/143 |
| 2013/0093224 | A1 * | 4/2013 | Dainese | B60R 21/207 297/216.12 |
| 2014/0151984 | A1 * | 6/2014 | Fukawatase | B60R 21/23138 280/730.2 |
| 2016/0082915 | A1 * | 3/2016 | Madaras | B60R 21/231 297/216.2 |
| 2016/0144818 | A1 * | 5/2016 | Mihm | B60R 21/2338 280/730.2 |
| 2016/0280177 | A1 * | 9/2016 | Young | B60R 21/2342 |
| 2019/0210551 | A1 * | 7/2019 | Veggian | B60R 21/2165 |
| 2020/0189514 | A1 * | 6/2020 | Yoo | B60N 2/79 |
| 2020/0384941 | A1 * | 12/2020 | Kwon | B60R 21/2338 |
| 2021/0179009 | A1 * | 6/2021 | Lee | B60R 21/2338 |

FOREIGN PATENT DOCUMENTS

JP      2011051414 A  *  3/2011

\* cited by examiner

*Primary Examiner* — Darlene P Condra

(74) *Attorney, Agent, or Firm* — Frank A. MacKenzie; Bejin Bieneman PLC

(57) ABSTRACT

A restraint system includes a seat having a seatback and a seat bottom extending from the seatback in a seat-forward direction. A first airbag is fixed to the seatback at a side of the seat, and a second airbag is fixed to the seat bottom at the side of the seat. The first and second airbags are each inflatable to an inflated position. The second airbag in the inflated position overlaps the first airbag in the inflated position in a seat-rearward direction.

20 Claims, 6 Drawing Sheets

SIDE AIRBAG ASSEMBLY

BACKGROUND

A side airbag is mounted to a seatback and is inflatable along a side of an occupant, specifically along the torso and/or hip of the occupant. The side airbag, for example, may be inflatable between the occupant and a vehicle door. The side airbag controls the kinematics of the occupant in vehicle impacts that urge the occupant in a cross-vehicle direction, e.g., a side impact.

DETAILED DESCRIPTION

Figure 1:
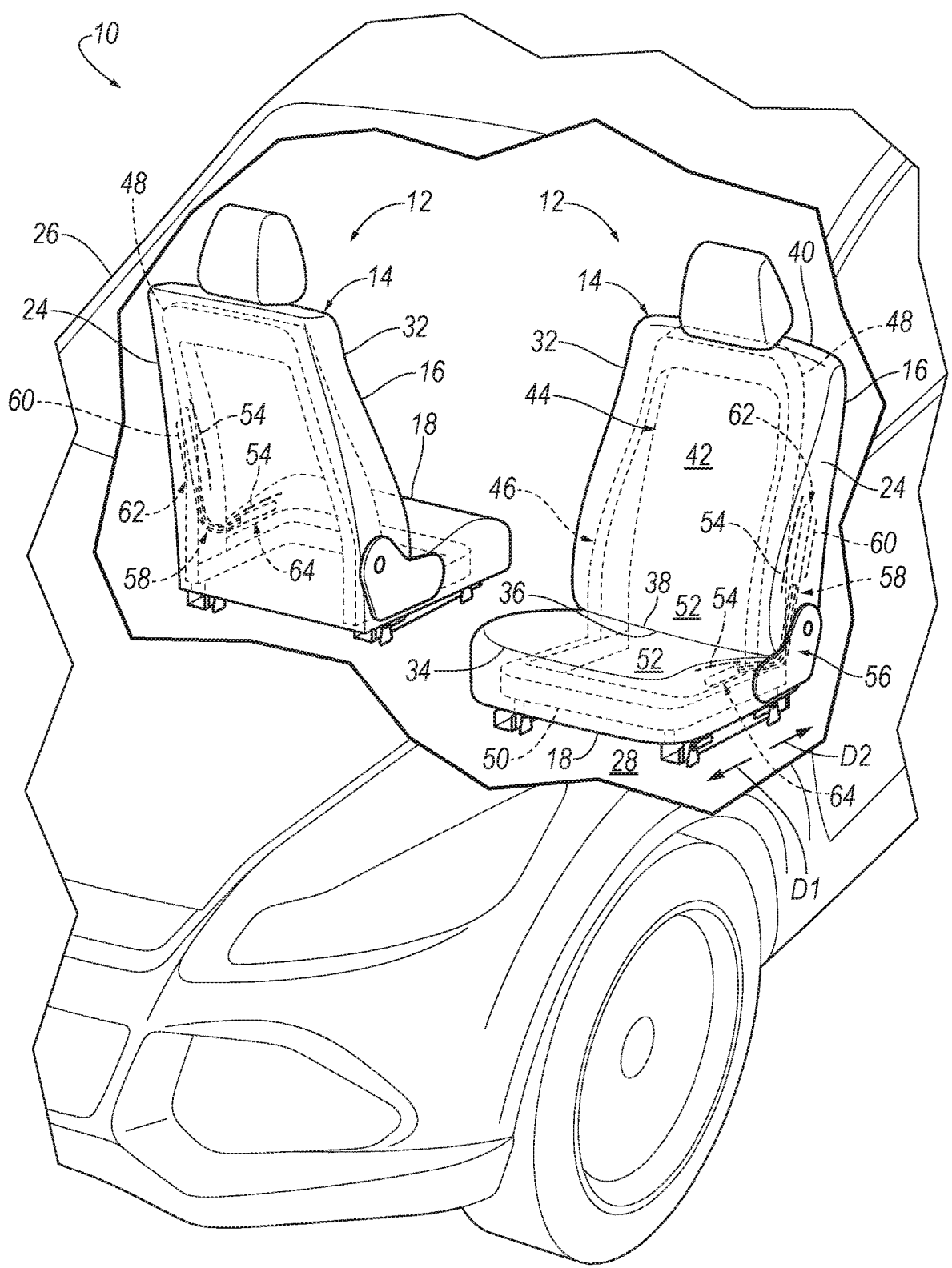
FIG. 1 is a perspective view of an example vehicle including a seat support first and second airbags in an uninflated position.

A restraint system includes a seat having a seatback and a seat bottom extending from the seatback in a seat-forward direction. A first airbag is fixed to the seatback at a side of the seat, and a second airbag is fixed to the seat bottom at the side of the seat. The first and second airbags are each inflatable to an inflated position. The second airbag in the inflated position overlaps the first airbag in the inflated position in a seat-rearward direction.

The first and second airbags maybe fluidly separated from each other.

The second airbag in the inflated position may extend in the seat-forward direction farther from the seatback than the first airbag in the inflated position.

The seatback may be pivotable relative to the seat bottom between an upright position and a reclined position. The second airbag in the inflated position may overlap the first airbag in the inflated position when the seatback is in the upright position and when the seatback is in the reclined position.

In the inflated position, the second airbag may abut the seatback in the upright position and may be spaced from the seatback in the reclined position.

The restraint system may include an inflator supported by the seatback. The inflator may be in fluid communication with the first airbag and the second airbag.

The restraint system may include a fill tube assembly extending from the inflator to the second airbag. The fill tube assembly may extend along the seatback and the seat bottom.

The fill tube assembly may include a fill tube and a cover enclosing the fill tube. The fill tube and the cover may be flexible relative to the seat.

The inflator may initiate inflation of one of the first airbag and the second airbag prior to the other of the first airbag and the second airbag.

The restraint system may include an external tether extending from the first airbag to the second airbag. The external tether may be fixed to the first airbag and the second airbag.

At least one of the first airbag and the second airbag may be disposed between the external tether and the seat.

The seat may have an occupant seating area. The first and second airbags may be disposed outboard of the occupant seating area relative to the seat.

The seatback may include a bottom at the seat bottom and a top spaced from the bottom. The first airbag may be disposed closer to the bottom than the top of the seatback.

The seat bottom may include a back end at the seatback and a front end spaced from the back end in the seat-forward direction. The second airbag may be disposed closer to the back end than the front end of the seat bottom. The seat may have an occupant seating area. The first and second airbags may be disposed outboard of the occupant seating area relative to the seat.

The seat bottom may include a back end at the seatback and a front end spaced from the back end in the seat-forward direction. The second airbag may be disposed closer to the back end than the front end of the seat bottom.

The seat may be rotatable between a vehicle-forward position and a vehicle-rearward position.

The restraint system may include a processor and a memory storing instructions to inflate the first and second airbags in response to detecting an impact when the seat is in the vehicle-forward position.

With reference to the Figures, wherein like numerals indicate like parts throughout the several views, a vehicle 10 is generally shown. The vehicle 10 includes a restraint system 12. The restraint system 12 includes a seat 14 having a seatback 16 and a seat bottom 18 extending from the seatback 16 in a seat-forward direction D1. The restraint system 12 includes a first airbag 20 fixed to the seatback 16 at a side 24 of the seat 14 and a second airbag 22 fixed to the seat bottom 18 at the side 24 of the seat 14. The first and second airbags 20, 22 are inflatable to an inflated position. The second airbag 22 in the inflated position overlaps the first airbag 20 in the inflated position in a seat-rearward direction D2.

Figure 2A:
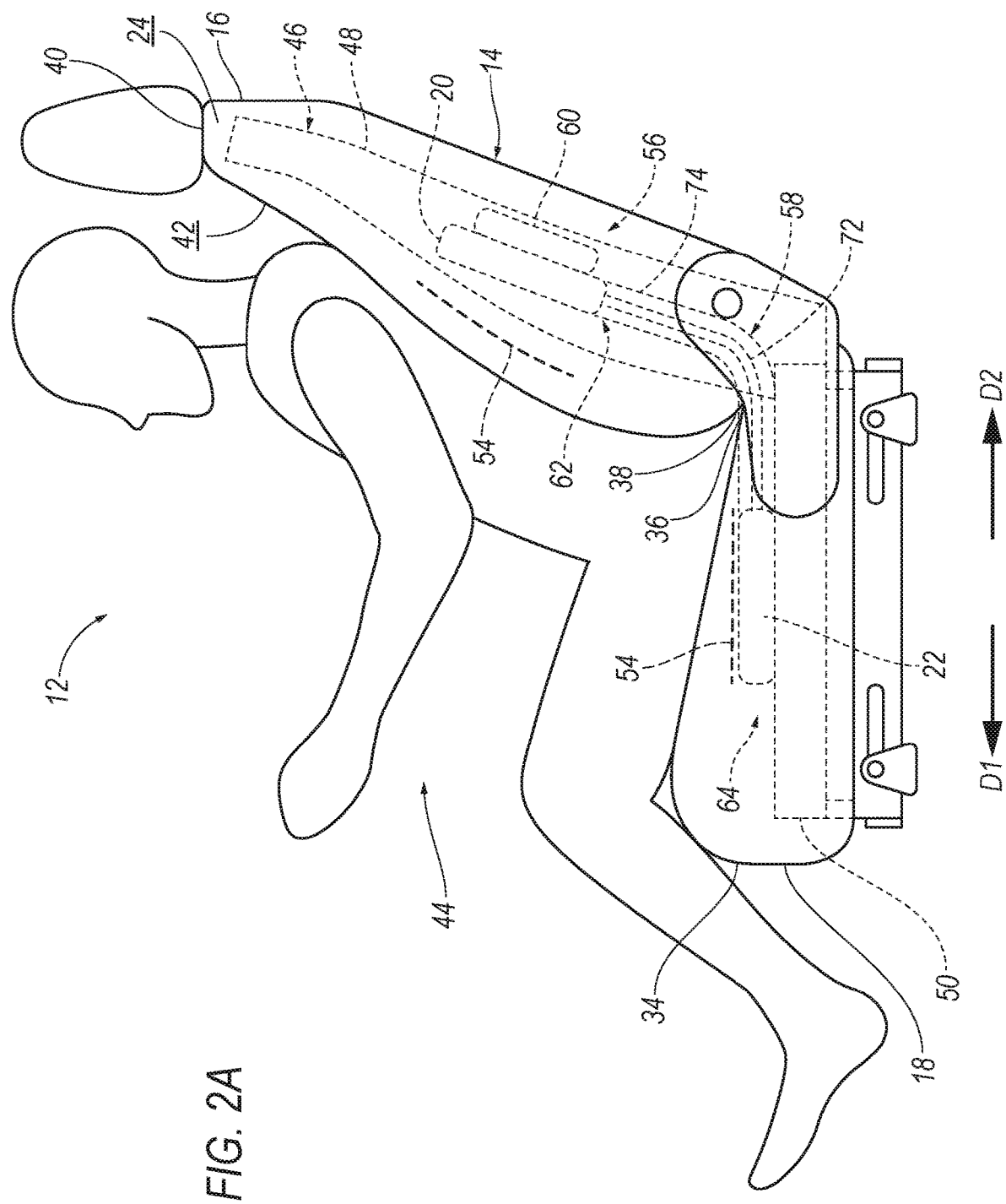
FIG. 2A is a side view of the seat in an upright position and the first and second airbags in the uninflated position.
Figure 2B:
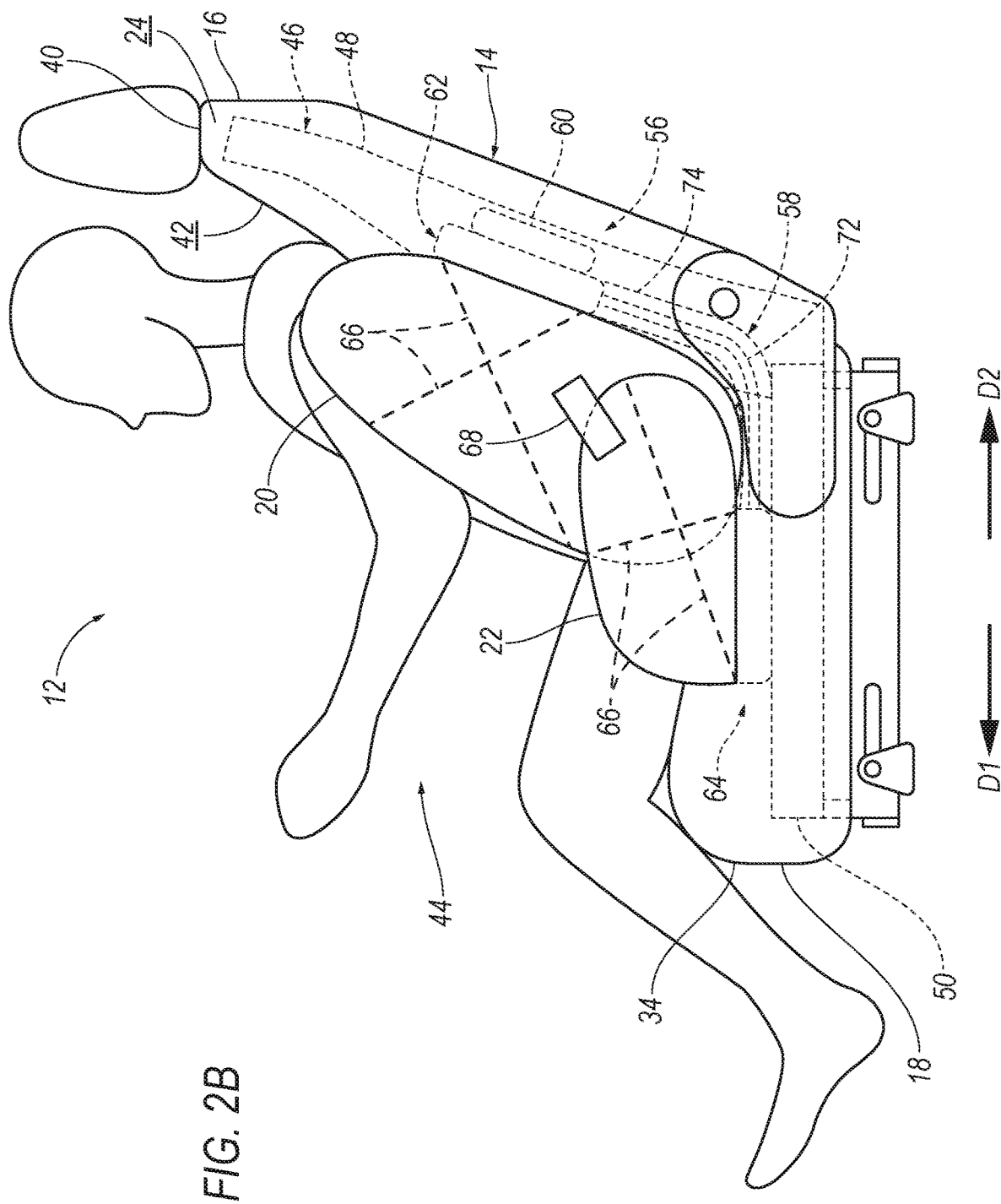
FIG. 2B is a side view of the seat in the upright position and the first and second airbags in an inflated position.
Figure 3A:
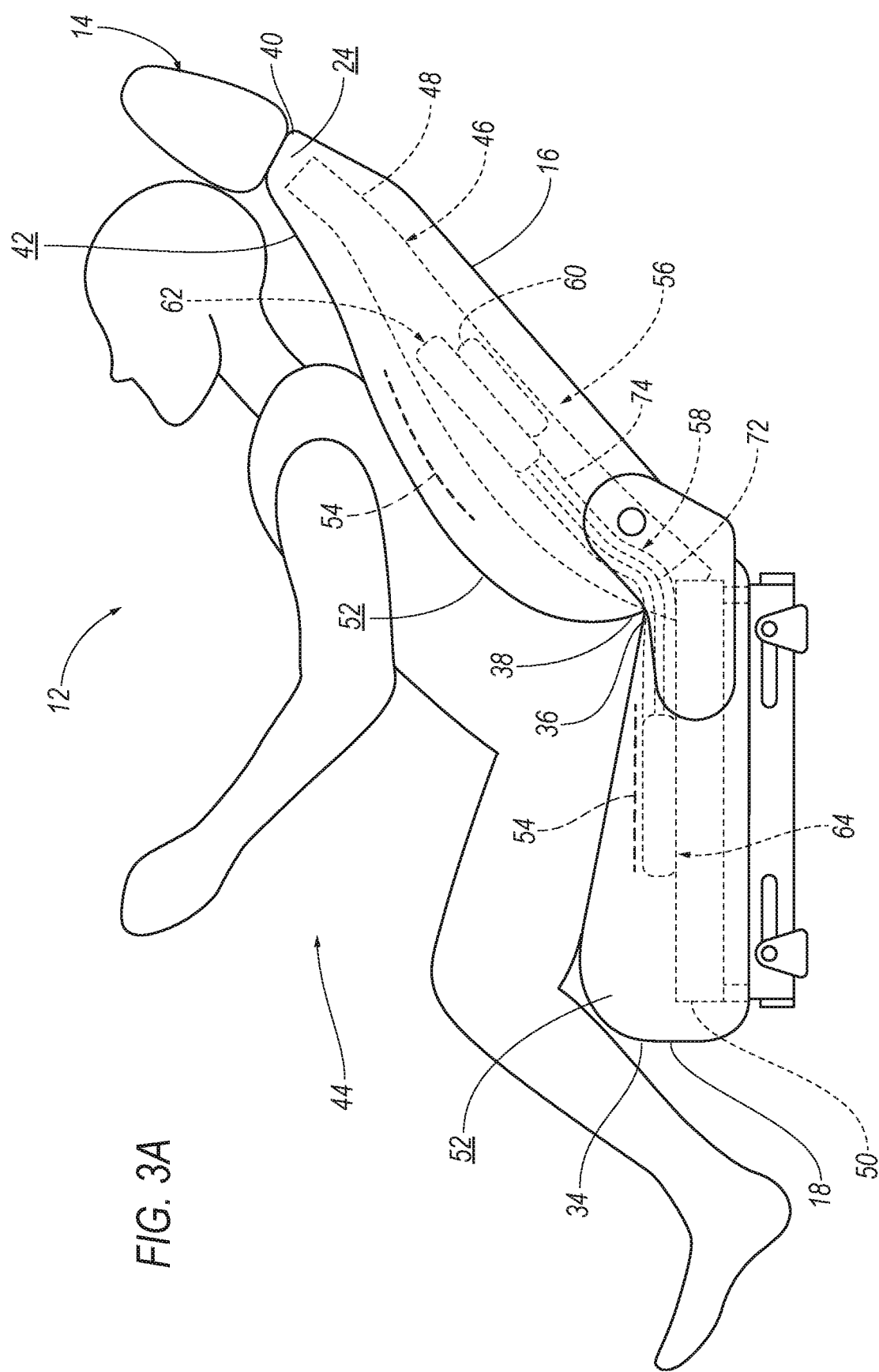
FIG. 3A is a side view of the seat in a reclined position and the first and second airbags in the uninflated position.
Figure 3B:
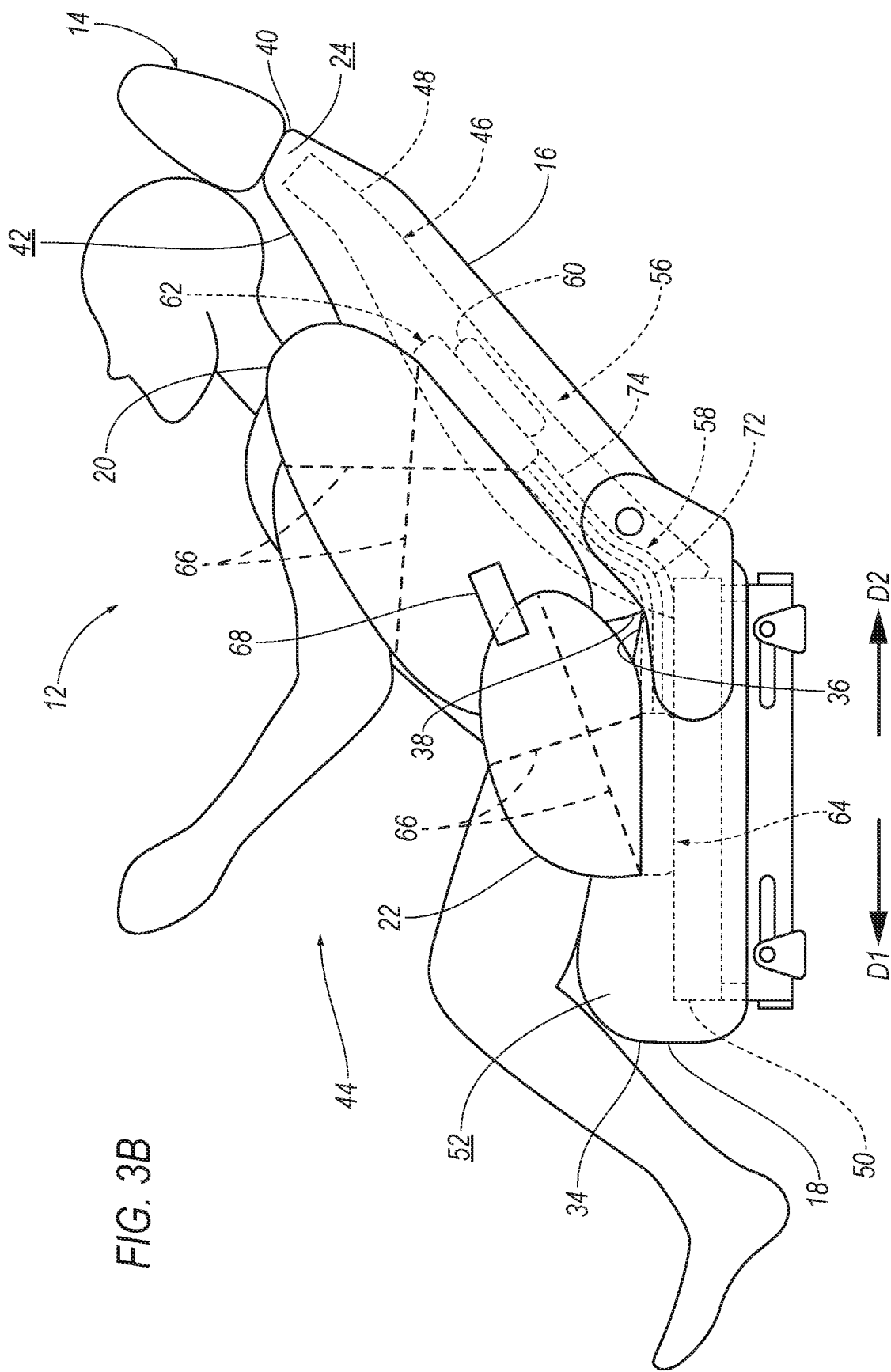
FIG. 3B is a side view of the seat in the reclined position and the first and second airbags in the inflated position.

During a vehicle impact, the seatback 16 may be in any angular position relative to the seat bottom 18, as described further below. Additionally, the first and second airbags 20, 22 each may be inflated from an uninflated position, as shown in FIGS. 1, 2A and 3A, to an inflated position, as shown in FIGS. 2B and 3B. During the vehicle impact, the occupant may be forced into the first airbag 20 in the inflated position and the second airbag 22 in the inflated position. During the vehicle impact, the first and second airbags 20, 22 may provide coverage so as to control the kinematics of the occupant. By overlapping the first and second airbags 20, 22, the first and second airbags 20, 22 may increase the likelihood that the airbags 20, 22 provides coverage to control the kinematics of the occupant regardless of the angular position of the seatback 16 relative to the seat bottom 18.

With reference to FIG. 1, the vehicle 10 may be any type of passenger or commercial automobile such as a car, a truck, a sport utility vehicle, a crossover, a van, a minivan, a taxi, a bus, etc. The vehicle 10, for example, may be an autonomous vehicle. In other words, the vehicle 10 may be autonomously operated such that the vehicle 10 may be driven without constant attention from a driver, i.e., the vehicle 10 may be self-driving without human input.

With reference to FIG. 1, the vehicle 10 may include a body 26 defining a passenger cabin (not numbered) to house occupants, if any, of the vehicle 10. The body 26 may include a roof (not numbered) and a floor 28 with the roof defining an upper boundary of the passenger cabin and the floor 28 defining a lower boundary of the passenger cabin. The body 26 includes doors openable to allow ingress to and egress from the passenger cabin.

The passenger cabin may extend across the vehicle 10, i.e., from one side to the other side of the vehicle 10. The passenger cabin includes a front end (not numbered) and a rear end (not numbered) with the front end being in front of the rear end during forward movement of the vehicle 10. The passenger cabin includes one or more seats 14. The seats 14 may be arranged in any suitable arrangement. For example, one or more of the seats 14 may be at the front end of the passenger cabin, i.e., a front seat, and/or one or more of the seats 14 may be at the rear end of the passenger cabin, i.e., a rear seat.

With reference to the Figures, the seatback 16 may be supported by the seat bottom 18 and may be movable relative to the seat bottom 18. The seatback 16 and the seat bottom 18 may be adjustable in multiple degrees of freedom. Specifically, the seatback 16 and the seat bottom 18 may themselves be adjustable, in other words, adjustable components within the seatback 16 and/or the seat bottom 18 may be adjustable relative to each other.

The seatback 16 may be pivotable relative to the seat bottom 18 to a plurality of angular positions. In other words, the seatback 16 may be disposed in any suitable angular position relative to the seat bottom 18. For example, the seatback 16 may be in an upright position. In other words, the seatback 16 may be generally upright, i.e., orthogonal, relative to the seat bottom 18, as shown in FIGS. 1-2B. As another example, the seatback 16 may be in a reclined position. In other words, the seatback 16 may be reclined relative to the seat bottom 18, as shown in FIGS. 3A-3B. In such an example, the seatback 16 may be oblique, i.e., neither parallel nor perpendicular, to the seat bottom 18. Alternatively, the seatback 16 may be parallel to the seat bottom 18. The seatback 16 may be releasably fixed in position relative to the seat bottom 18 at a selected one of the plurality of angular positions in any suitable way.

With reference to FIG. 1, each seat 14 includes two sides 24, 32 spaced from each other. The seat 14 may terminate at the sides 24, 32. The sides 24, 32 extend along the seatback 16 and the seat bottom 18. The sides 24, 32 may support an occupant laterally relative to the seat 14. As one example, one of the sides 24, 32 may be an outboard side 24, and the other of the sides 24, 32 may be an inboard side 32 (with "inboard" and "outboard" referring to the relative position of the sides in a cross-vehicle direction). In such an example, the outboard side 24 is between the inboard side 32 of the seat 14 and an adjacent door.

As shown in the Figures, the seat bottom 18 includes a front end 34 and a back end 36. The seatback 16 is at the back end 36. The front end 34 is spaced from the back end 36 and the seatback 16. The seatback 16 extends across the seat bottom 18, e.g., from one side 24 of the seat 14 to the other side 32 of the seat 14, at the back end 36.

The seatback 16 includes a bottom 38 at the seat bottom 18 and a top 40 spaced from the bottom 38 and the seat bottom 18. For example, the top 40 may support a head restraint (not numbered), i.e., be disposed between the head restraint and the seat bottom 18. The seatback 16 includes a front 42 that faces an occupant seating area 44 of the seat 14. The occupant seating area 44 is the area occupied by an occupant when seated on the seat bottom 18.

The seat-forward direction D1 extends forward relative to the seat 14. For example, the seat-forward direction D1 may extend from a rear of the seat 14 to a front of the seat 14 relative to an occupant of the seat 14, i.e., the occupant of the seat 14 faces in the seat-forward direction D1. The seat-rearward direction D2 extends rearward relative to the seat 14, e.g., from the front of the seat 14 to the rear of the seat 14 relative to the occupant of the seat 14. In other words, the seat-rearward direction D2 extends in an opposite direction than the seat-forward direction D1.

With reference to FIG. 1, the seat 14 includes a seat frame 46. The seat frame 46 includes a seatback frame 48 and a seat bottom frame 50. A hinge (not numbered) couples the seat bottom frame 50 and the seatback frame 48 together. The hinge permits the seatback frame 48 to pivot relative to the seat bottom frame 50, as discussed above. The seat frame 46 may include panels and/or may include tubes, beams, etc. The seat frame 46 may be formed of any suitable plastic material, e.g., carbon fiber reinforced plastic (CFRP), glass fiber-reinforced semi-finished thermoplastic composite (organosheet), etc. Alternatively, for example, some or all components of the frame may be formed of a suitable metal, e.g., steel or aluminum.

With continued reference to FIG. 1, the seat 14 includes a covering 52 supported on the seat frame 46. The covering 52 may be cloth, leather, faux leather, or any other suitable material. The seat 14 may include padding material between the covering 52 and the seat frame 46. The padding material may be foam or any other suitable material. The cover may be stitched in panels around the seat frame 46 and padding material.

With continued reference to FIG. 1, the seat 14, e.g., the covering 52, may include tear seams 54. The tear seams 54 may be disposed on at least one side 24, 32 of the seat 14. For example, one tear seam 54 may extend along the seatback 16 adjacent to the first airbag 20, and another tear seam 54 may extend along the seat bottom 18 adjacent to the second airbag 22. Said differently, the airbags 20, 22 may extend through the tear seams 54 in the inflated position. The tear seams 54 may have any suitable shape. For example, the tear seams 54 may have a linear shape, i.e., extending in a line along the seat 14.

The tear seam 54 may be designed to tear apart when subjected to a tensile force above a threshold magnitude. In other words, the covering on one side of the tear seam 54 separates from the covering on the other side of the tear seam 54 when the force is above the threshold magnitude. The threshold magnitude may be chosen to be greater than forces from, e.g., inadvertent pushing against the seat 14 by an occupant but be less than forces from the deployment of the first and second airbags 20, 22. The tear seam 54 may be, for example, a line of perforations through the covering, a line of thinner covering material than the rest of the covering, etc.

Each seat 14 is supported by the floor 28, as shown in FIG. 1. The orientation of the seats 14 relative to the floor 28, i.e., the direction of the seat-forward direction D1, may be adjustable by an occupant. Each seat 14 may be rotatable relative to the floor 28. For example, each seat 14 may be supported by a rotation mechanism (not shown) supported by the floor 28. The rotation mechanism may, for example, include rings that are rotatable relative to each other. As another example, the seat 14 may include a rotatable post. Alternatively, the seat 14 may include any suitable structure for rotating the seat 14 about a generally vertical axis. In other words, the seat 14 is rotatable to face in different directions. For example, the seats 14 may rotate between a vehicle-forward position, a vehicle-rearward position, a vehicle-rightward position, a vehicle-leftward position, and/ or positions therebetween. For example, one of the seats 14 is in the vehicle-forward position and the other of the seats 14 is in the vehicle-rearward position in FIG. 1. In the vehicle-forward position, an occupant of the seat 14 faces an instrument panel, i.e., the seat-forward direction D1 generally aligns with a vehicle-forward direction. The seat 14 may rotate completely, i.e. 360° about the axis. The seat 14 may rotate to face any number of directions.

Additionally, or alternatively, each seat 14 may slide relative to the floor 28, e.g., in the seat-forward direction D1 or the seat-rearward direction D2. In such an example, the seat 14 may be supported on a seat track (not shown) to allow the seat 14 to move in the seat-forward direction D1 or the seat-rearward direction D2. The seat 14 may be selectively slidable relative to the seat track. In other words, the occupant may slide the seat 14 along the seat track and may secure the seat 14 to the seat track at selected position. For example, the occupant may actuate a motor (not shown) that moves the seat 14 along the seat track. As another example, each seat 14 may be fixed relative to the floor 28. In this situation, the seat 14 may be immovable relative to the floor 28.

The restraint system 12 includes a side airbag assembly 56, which includes the first airbag 20, the second airbag 22, a fill tube assembly 58, and an inflator 60, as shown in FIGS. 2A-3B. The seat 14 may support the side airbag assembly 56, and specifically, may support the airbags 20, 22 when the airbags 20, 22 are in the inflated position. The side airbag assembly 56 may be mounted to the seat 14, as set forth below. More than one side airbag assembly 56 may be supported on the seat 14. For example, one side airbag assembly 56 be supported on the outboard side 24 of the seat 14, as shown in the Figures. In such an example, the first and second airbags 20, 22 are deployable in the space between the seat 14 and an adjacent door. As another example, one side airbag assembly 56 may be supported on each side 24, 32 of the seat 14.

The side airbag assembly 56 may include two bases 62, 64 attached to the seat 14 and supporting one respective airbag 20, 22, as shown in FIGS. 2A-3B. For example, each side airbag assembly 56 may include a first base 62 attached to the seatback 16 and supporting the first airbag 20, and a second base 64 attached to the seat bottom 18 and supporting the second airbag 22. The bases 62, 64 may be flat. As another example, the bases 62, 64 may include a cavity (not shown) that may house the respective airbag 20, 22 in the uninflated position and may support the respective airbag 20, 22 on the seat 14 in the inflated position. In other words, the bases 62, 64 may be a housing. The bases 62, 64 may, for example, include clips, panels, etc. for attaching the respective airbag 20, 22 and for attaching the side airbag assembly 56 to the seat 14.

The first and second airbags 20, 22 may be woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The first airbag 20 may be a single continuous unit, e.g., a single piece of fabric. Alternatively, the first airbag 20 may include a plurality of segments, i.e., two or more. The segments may be attached to each other in any suitable fashion, e.g., a plurality of panels attached by stitching, ultrasonic welding, etc.

The first airbag 20 is supported by the seatback 16, as shown in the Figures. In the uninflated position, the first airbag 20 may be disposed in the seatback 16, e.g., between the covering 52 and the seatback frame 48. In other words, the covering 52 may cover the first airbag 20 in the uninflated position. In the uninflated position, the first airbag 20, i.e., the first base 62, may, for example, be disposed closer to the bottom 38 of the seatback 16 than to the top 40 of the seatback 16. In other words, the first airbag 20, i.e., the first base 62, may be disposed between the bottom 38 of the seatback 16 and a midline bisecting the seatback 16 along a lateral axis of the seat 14.

In the inflated position, the first airbag 20 may extend through the seatback 16, e.g., the tear seam 54 adjacent to the first airbag 20, as shown in FIGS. 2B and 3B. In this situation, the first airbag 20 may extend outwardly from the seatback 16, e.g., in the seat-forward direction D1. In the inflated position, the first airbag 20 may extend any suitable amount in the seat-forward direction D1. Additionally, the first airbag 20 may extend along the seatback 16 in the inflated position. In the inflated position, the first airbag 20 may be disposed closer to the bottom 38 of the seatback 16 than to the top 40 of the seatback 16. For example, the first airbag 20 may extend from the bottom 38 of the seatback 16 towards the top 40 of the seatback 16 in the inflated position. The first airbag 20 may extend any suitable amount from the bottom 38 along the seatback 16 in the inflated position. When the seat 14 is in the upright position, the first airbag 20 may abut the seat bottom 18. When the seat 14 is in the reclined position, the first airbag 20 may be spaced from the seat bottom 18.

In the inflated position, the first airbag 20 may extend next to the occupant seating area 44 to control kinematics of the occupant, e.g., of a torso. For example, in the inflated position, the first airbag 20 may be disposed outboard of the occupant seating area 44. In other words, the first airbag 20 may be disposed between the occupant seating area 44 and the door. As set forth above, the first airbag 20 extends into the space between the occupant seating area 44 and the door in the inflated position. The first airbag 20 may abut the door in the inflated position. In other words, the door may be a reaction surface for the first airbag 20. That is, the door may provide a counteracting force against the first airbag 20 when the first airbag 20 is impacted by the occupant.

The second airbag 22 may be a single continuous unit, e.g., a single piece of fabric. Alternatively, the second airbag 22 may include a plurality of segments, i.e., two or more. The segments may be attached to each other in any suitable fashion, e.g., a plurality of panels attached by stitching, ultrasonic welding, etc.

The second airbag 22 is supported by the seat bottom 18, as shown in the Figures. In the uninflated position, the second airbag 22 may be disposed in the seat bottom 18, e.g., between the covering 52 and the seat bottom frame 50. In other words, the covering 52 may cover the second airbag 22 in the uninflated position. In the uninflated position, the second airbag 22, i.e., the second base 64, may, for example, be disposed closer to the back end 36 of the seat bottom 18 than to the front end 34 of the seat bottom 18. In other words, the second airbag 22, i.e., the second base 64, may be disposed between the back end 36 of the seat bottom 18 and a midline bisecting the seat bottom 18 along a vertical axis of the seat 14.

In the inflated position, the second airbag 22 may extend through the seat bottom 18, e.g., the tear seam 54 adjacent to the second airbag 22, as shown in FIGS. 2B and 3B. In this situation, the second airbag 22 may extend upwardly from the seat bottom 18, e.g., in a direction towards the roof of the vehicle 10. Additionally, the second airbag 22 may extend along the seat bottom 18, i.e., in the seat-forward direction D1, in the inflated position. In the inflated position, the second airbag 22 may be disposed closer to the back end 36 of the seat bottom 18 than to the front end 34 of the seat bottom 18. For example, the second airbag 22 may extend from the back end 36 of the seat bottom 18 towards the front end 34 of the seat bottom 18 in the inflated position. The second airbag 22 in the inflated position extends farther in the seat-forward direction D1 than the first airbag 20 in the inflated position. That is, at least a portion of the second airbag 22 is disposed between the first airbag 20 and the front end 34 of the seat bottom 18. When the seat 14 is in the upright position, the second airbag 22 may abut the seatback 16. When the seat 14 is in the reclined position, the second airbag 22 may be spaced from the seatback 16.

In the inflated position, the second airbag 22 may extend next to the occupant seating area 44 to control kinematics of the occupant, e.g., of a pelvis. For example, in the inflated position, the second airbag 22 may be disposed outboard of the occupant seating area 44. In other words, the second airbag 22 may be disposed between the occupant seating area 44 and the door. As set forth above, the second airbag 22 extends into the space between the occupant seating area 44 and the door in the inflated position. The second airbag 22 may abut the door in the inflated position. In other words, the door may be a reaction surface for the second airbag 22. That is, the door may provide a counteracting force against the second airbag 22 when the second airbag 22 is impacted by the occupant.

The first airbag 20 and the second airbag 22 may be fluidly separated from each other. Fluidly separated means little or no inflation medium flows from one to another, but the inflation medium can come from the same source, e.g., a common inflator 60 that separately feeds the first airbag 20 and the second airbag 22 through separate fill tubes. As one example, the first airbag 20 and the second airbag 22 are completely fluidly separated, i.e., there is not flow of inflation medium between the first airbag 20 and the second airbag 22. In another example, due to manufacturing and material capabilities, a minimal amount of inflation medium may flow between the first airbag 20 and the second airbag 22, e.g., through panels, seams etc. In any event, in scenarios when the airbag 22 is inflated and impacted, the pressure in the first airbag 20 and the second airbag 22 are independent, i.e., no appreciable pressure difference is communicated from one of the first and second airbags 20, 22 to the other of the first and second airbags 20, 22.

One of the first airbag 20 or the second airbag 22 is disposed between the other of the first airbag 20 or the second airbag 22 and the occupant seating area 44. For example, the second airbag 22 may be disposed between the first airbag 20 and the occupant seating area 44. In other words, the first airbag 20 may be disposed outboard of the second airbag 22. As another example, the first airbag 20 may be disposed between the second airbag 22 and the occupant seating area 44. In other words, the second airbag 22 may be disposed outboard of the first airbag 20.

As set forth above, the second airbag 22 in the inflated position overlaps the first airbag 22 in the inflated position in the seat-rearward direction D2. For example, the second airbag 22 may overlap the first airbag 20 between the seatback 16 and the second base 64, as shown in FIGS. 2B and 3B. That is, an axis extending in the cross-vehicle direction and between the seatback 16 and the second base 64 intersects the first airbag 20 in the inflated position and the second airbag 22 in the inflated position. The second airbag 22 may overlap the first airbag 20 by any suitable amount in the seat-rearward direction D2. Additionally, the second airbag 22 may overlap the first airbag 20 by any suitable amount in the direction towards the roof. The second airbag 22 overlaps the first airbag 20 when the seat 14 is in the upright position, as shown in FIG. 2B. Additionally, the second airbag 22 overlaps the first airbag 20 when the seat 14 is in the reclined position, as shown in FIG. 3B. By overlapping the first and second airbags 20, 22 when the seat 14 is in the upright position and in the reclined position, the side airbag assembly 56 can control kinematics of a torso and a pelvis for both an occupant seated upright in the seat 14 and an occupant reclined in the seat 14.

With reference to FIGS. 2B and 3B, each airbag 20, 22 may include a plurality of internal tethers 66 disposed in an inflation chamber of the respective airbag 20, 22. The internal tethers 66 may extend across the inflation chamber, e.g., from the respective base 62, 64 to the respective airbag 20, 22. The internal tethers 66 may be fixed, e.g., via stitching, ultrasonic welding, etc., to the respective base 62, 64 and the respective airbag 20, 22 in the inflation chamber. The airbags 20 may include any suitable number of internal tethers 66. The internal tethers 66 may be any suitable material. For example, the internal tethers 66 may be a same material as the airbags 20, 22. The internal tethers 66 may be positioned to control the shapes of each of the first and second airbag 20, 22.

With continued reference to FIGS. 2B and 3B, the side airbag assembly 56 may include an external tether 68 disposed external to the inflation chambers of the airbags 20, 22. The external tether 68 may extend from the first airbag 20 to the second airbag 22. The external tether 68 may be attached to the first airbag 20 and the second airbag 22, e.g., via stitching, ultrasonic welding, etc. The external tether 68 may be positioned to control the position the first and second airbags 20, 22 in the inflated position.

At least one of the first airbag 20 and the second airbag 22 may be disposed between the external tether 68 and the seat 14. For example, the external tether 68 may, for example, be disposed outboard of the airbags 20, 22. In other words, the airbags 20, 22 may be disposed between the external tether 68 and the seat 14, as shown in FIGS. 2B and 3B. As another example, the external tether 68 may be disposed inboard of one of the airbags 20, 22 and outboard of the other of the airbags 20, 22. In such an example, the external tether 68 may extend between the first airbag 20 and the second airbag 22 such that one end of the external tether 68 is disposed between the airbags 20, 22 and the seat 14 and the airbags 20, 22 are disposed between the other end of the external tether 68 and the seat 14. Alternatively, the external tether 68 may be disposed inboard of the airbags 20, 22. In other words, the external tether 68 may be disposed between the airbags 20, 22 and the seat 14.

With reference to FIGS. 2A-3B, the side airbag assembly 56 includes the fill tube assembly 58. The fill tube assembly 58 extends from the inflator 60 to the second airbag 22. The fill tube assembly 58 allows gas, e.g., inflation medium, to flow from the inflator 60 to the second airbag 22. The fill tube assembly 58 extends along the seatback 16 and the seat bottom 18.

With continued reference to FIGS. 2A-3B, the fill tube assembly 58 includes a tube 72 and a cover 74 enclosing the tube 72. The tube 72 and the cover 74 are flexible relative to the seat 14. In other words, the tube 72 and the cover 74 may be formed of a material that elastically deforms more for a given application of force than the material forming the seat 14. For example, the tube 72 and the cover 74 may bend without binding, i.e., preventing gas to flow through the tube 72, when the seatback 16 is moved between angular positions. For example, the tube 72 and the cover 74 can be formed of an elastomeric material and/or a plastic. The cover 74 may be formed of a different material than the tube 72. For example, the cover 74 may be formed of a material that resists bending more than the tube 72. In other words, the material of the cover 74 may be more rigid than material of the tube 72. The tube 72 may have a layered structure, e.g., braiding or fabric embedded in a matrix material such as plastic. The cover 74 may have a corrugated structure.

The inflator 60 is in fluid communication with both airbags 20, 22. The inflator expands the airbags 20, 22 with inflation medium, such as a gas, to move the airbags 20, 22 from the uninflated positions to the inflated positions. The inflator 60 may be supported by the seatback 16, as shown in the Figures. The inflator 60 may be, for example, a pyrotechnic inflator that ignites a chemical reaction to generate the inflation medium, a stored gas inflator that releases (e.g., by a pyrotechnic valve) stored gas as the inflation medium, or a hybrid. The inflator may be, for example, at least partially in the inflation chamber to deliver inflation medium directly to the inflation chamber or may be connected to the inflation chamber through fill tubes, diffusers, etc.

The inflator 60 may have two separate outlets in communication with the first airbag 20 and the second airbag 22, respectively. The two outlets may, for example, be sized to inflate the respective airbags 20, 22 to a desired inflation pressure within a desired amount of time. For example, one outlet may be in fluid communication with the first airbag 20 via a fill tube, and the other outlet may be in fluid communication with the second airbag 22 via the fill tube assembly 58, as shown in the Figures. Upon receiving a signal from, e.g., a controller 78, the inflator 60 may initiate inflation of the first airbag 20 and the second airbag 22 with an inflatable medium, such as a gas, simultaneously. Alternatively, upon receiving a signal from, e.g., the controller 78, the inflator 60 may initiate inflation of one of the first airbag 20 or the second airbag 22 prior to the other of the first airbag 20 or the second airbag 22. In alternative examples, the inflators 60 may separately inflate the first airbag 20 and the second airbag 22 in any suitable fashion. For example, the side airbag assembly 56 may include a first inflator in fluid communication with the first airbag 20 and a second inflator in fluid communication with the second airbag 22.

Figure 4:
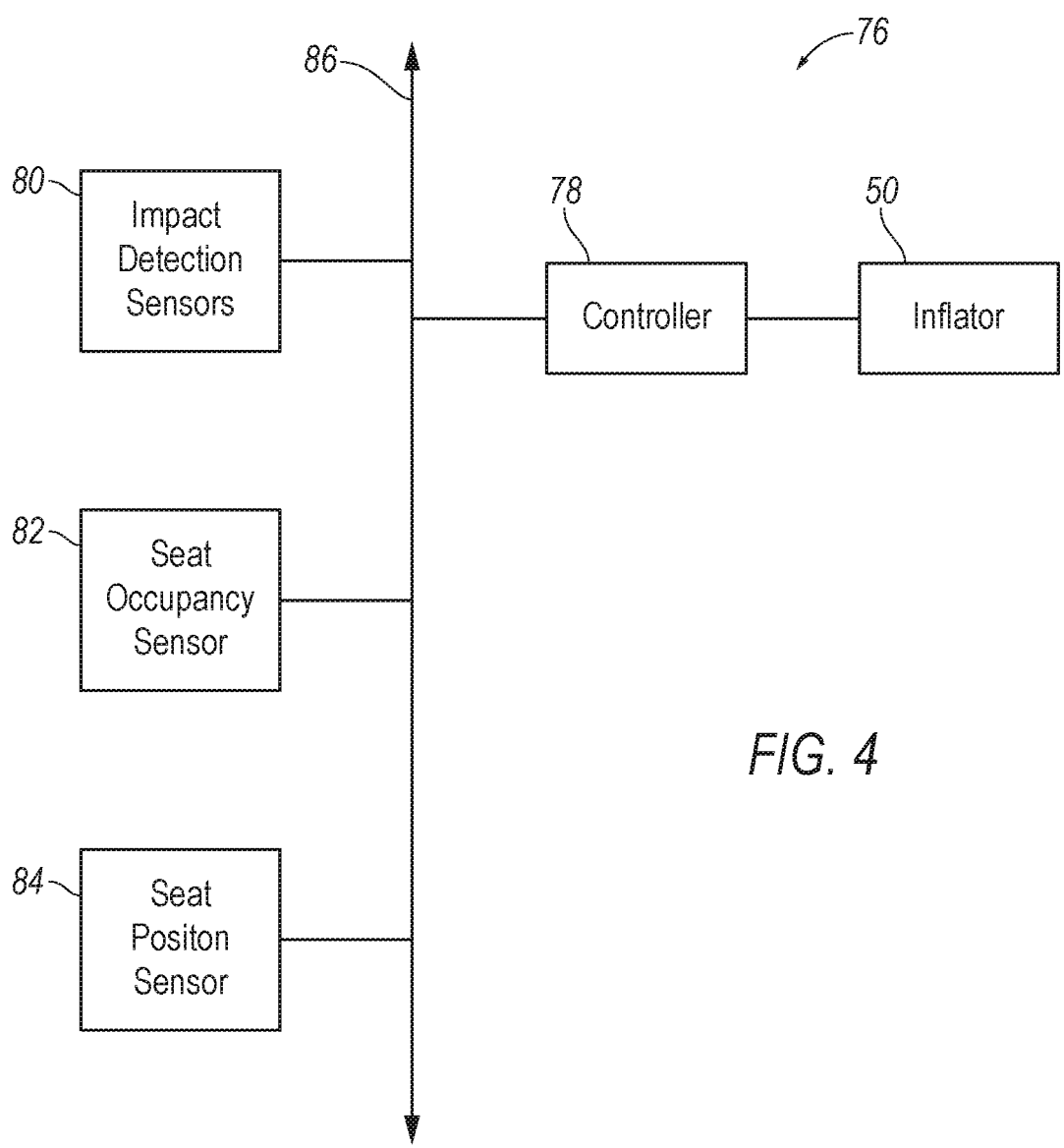
FIG. 4 is a block diagram of an inflation system of the vehicle.

With reference to FIG. 4, the vehicle may include a control system 76. The control system 76 may include the controller 78, an impact sensor 80, an occupancy sensor 82, a seat position sensor 84, and the side airbag assembly 56, e.g., the inflator 60, in communication through a communication network 86.

The seat position sensor 84 may be in communication with the controller 78. The seat position sensor 84 is programmed to detect a position of the seat 14. The control system 76 may include any suitable number of seat position sensors 84, e.g., one seat position sensor 84 for each seat 14. The seat position sensor 84 may be mounted to any suitable component of the vehicle 10, e.g., the seat 14, the floor 28, the rotation mechanism, etc. The seat position sensors 84 may be any suitable sensor in the seat 14 (e.g., rotary encoders, Hall-effect sensors, etc.) or exterior to the seat 14 (including cameras, image sensors, etc.). The controller 78 may receive one or more signals from the seat position sensors 84 indicating the position of the seat 14, e.g., the vehicle-rearward position, the vehicle-forward position, etc.

The impact sensor 80 may be in communication with the controller 78. The impact sensor 80 is programmed to detect an impact to the vehicle 10. The impact sensor 80 may be of any suitable type, for example, post-contact sensors such as accelerometers, pressure sensors, and contact switches; and pre-impact sensors such as radar, lidar, and vision-sensing systems. The vision systems may include one or more cameras, CCD image sensors, CMOS image sensors, etc. The impact sensor 80 may be located at numerous points in or on the vehicle 10.

The control system 76 includes the occupancy sensor 82 for the seat 14. The occupancy sensor 82 may be configured to detect occupancy of the seat 14. The occupancy sensor 82 may be visible-light or infrared cameras directed at the seat 14, weight sensors inside the seat 14, sensors detecting whether a seatbelt (not shown) for the seat 14 is buckled or unspooled, or other suitable sensors. The occupancy sensor 82 is in communication with the controller 78 via the communications network.

The controller 78 may be a microprocessor-based computing device implemented via circuits, chips, or other electronic components. The controller 78 may include a processor, memory, etc. The memory of the controller 78 may store instructions executable by the processor and the processor may read the instructions from the memory and execute the instructions.

The control system 76 may transmit signals through the communications network 86 such as a controller area network (CAN) bus, Ethernet, Local Interconnect Network (LIN), and/or by any other wired or wireless communications network.

The controller 78 may be programmed to selectively initiate one side airbag assembly 56 in response to a detection of a position of the seat 14 and detection of a sensed vehicle impact, e.g., a side impact. Specifically, the instructions include instructions to inflate the side airbag assembly 56 on the outboard side 24 of the seat 14. For example, one of the sides 24, 32 of the seat 14 is outboard (relative to the vehicle 10), which is detected based on the detection of the position, e.g., the vehicle-forward position or the vehicle-rearward position, of the seat 14. In other words, the controller 78 may be programmed to initiate inflation of the side airbag assembly 56, i.e., the first and second airbags 20, 22, between the occupant seating area 44 and the door.

The controller 78 may be programmed to initiate the inflation of at least one side airbag assembly 56 in response to the respective seat 14 being occupied. Specifically, the controller 78 may be programmed to receive a notification that the seat 14 is occupied and instruct the respective inflator to inflate the respective side airbag assembly 56 in response to the vehicle impact if the occupancy sensor 82 detects that the seat 14 is occupied.

Computing devices, such as the computer, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper internal and fiber optics, including the internals that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In operation, the first and second airbags 20, 22 are in the uninflated position, under normal operating conditions of the vehicle 10. In the event of a vehicle impact, the impact detection sensors 80 detect the impact. Additionally, the seat position sensors 84 detect the position of the seat 14. The impact detect sensors 80 transmit a signal indicating the vehicle impact collision through the communication network 86 to the controller 78. Additionally, the seat position sensors 84 transmit a signal indicating the position of the seat 14 through the communication network 86 to the controller 78. When the vehicle impact is detected, the controller 78 transmits a signal through the communication network 86 triggering the inflator 60 to inflate the first and second airbags 20, 22 on the outboard side 24 of the seat 14 with inflation medium from the uninflated position to the inflated position. When the inflator 60 inflates the airbags 20, 22 to the inflated position, the inflation medium flows into the first and second airbags 20, 22, increasing the pressure in the first and second airbags 20, 22. As the pressure is increased in the first and second airbags 20, 22, the first airbag 20 inflates outwardly from the seatback 16, and the second airbag 20 inflates upwardly from the seat bottom 18. The second airbag 22 in the inflated position overlaps the first airbag 20 in the inflated position regardless of the angular position of the seatback 16 relative to the seat bottom 18. As the occupant moves relative to the seat 14 due to momentum of the vehicle impact, the occupant moves towards the first and second airbags 20, 22. When the occupant impacts the first and second airbags 20, 22, the first and second airbags 20, 22 control the kinematics of the occupant. By overlapping the first and second airbags 20, 22, the first and second airbags 20, 22 control the kinematics of the occupant regardless of the angular position of the seatback 16 relative to the seat bottom 18.

The disclosure has been described in an illustrative manner, and it is to be understood that the terminology which has been used is intended to be in the nature of words of description rather than of limitation. The adjectives "first" and "second" are used throughout this document as identifiers and are not intended to signify importance or order. Many modifications and variations of the present disclosure are possible in light of the above teachings, and the disclosure may be practiced otherwise than as specifically described.

What is claimed is:

1. A restraint system comprising:
   a seat including a seatback and a seat bottom extending from the seatback in a seat-forward direction;
   a first airbag fixed to the seatback at a side of the seat and a second airbag fixed to the seat bottom at the side of the seat, the first and second airbags each inflatable to an inflated position; and
   the second airbag in the inflated position overlapping the first airbag in the inflated position in a seat-rearward direction;
   wherein the seatback is pivotable relative to the seat bottom between an upright position and a reclined position, the second airbag in the inflated position overlaps the first airbag in the inflated position when the seatback is in the upright position and when the seatback is in the reclined position.

2. The restraint system of claim 1, wherein the first and second airbags are fluidly separated from each other.

3. The restraint system of claim 1, wherein the second airbag in the inflated position extends in the seat-forward direction farther from the seatback than the first airbag in the inflated position.

4. The restraint system of claim 1, wherein, in the inflated position, the second airbag abuts the seatback in the upright position and is spaced from the seatback in the reclined position.

5. The restraint system of claim 1, further comprising an inflator supported by the seatback, the inflator is in fluid communication with the first airbag and the second airbag.

6. The restraint system of claim 5, further comprising a fill tube assembly extending from the inflator to the second airbag, wherein the fill tube assembly extends along the seatback and the seat bottom.

7. The restraint system of claim 6, wherein the fill tube assembly includes a fill tube and a cover enclosing the fill tube, the fill tube and the cover are flexible relative to the seat.

8. The restraint system of claim 6, wherein the inflator initiates inflation of one of the first airbag and the second airbag prior to the other of the first airbag and the second airbag.

9. The restraint system of claim 1, further comprising an external tether extending from the first airbag to the second airbag, the external tether fixed to the first airbag and the second airbag.

10. The restraint system of claim 9, wherein at least one of the first airbag and the second airbag is disposed between the external tether and the seat.

11. The restraint system of claim 1, wherein the seat has an occupant seating area, the first and second airbags are disposed outboard of the occupant seating area relative to the seat.

12. The restraint system of claim 1, wherein the seatback includes a bottom at the seat bottom and a top spaced from the bottom, the first airbag is disposed closer to the bottom than the top of the seatback.

13. The restraint system of claim 12, wherein the seat bottom includes a back end at the seatback and a front end spaced from the back end in the seat-forward direction, the second airbag is disposed closer to the back end than the front end of the seat bottom.

14. The restraint system of claim 13, wherein the seat has an occupant seating area, the first and second airbags are disposed outboard of the occupant seating area relative to the seat.

15. The restraint system of claim 1, wherein the seat bottom includes a back end at the seatback and a front end spaced from the back end in the seat-forward direction, the second airbag is disposed closer to the back end than the front end of the seat bottom.

16. The restraint system of claim 1, wherein the seat is rotatable between a vehicle-forward position and a vehicle-rearward position.

17. The restraint system of claim 16, further comprising a processor and a memory storing instructions to inflate the first and second airbags in response to detecting an impact when the seat is in the vehicle-forward position.

18. The restraint system of claim 1, wherein, in the inflated position, the first airbag abuts the seat bottom when the seatback is in the upright position and is spaced from the seat bottom when the seatback is in the reclined position.

19. A restraint system comprising:
- a seat including a seatback and a seat bottom extending from the seatback in a seat-forward direction;
- a first airbag fixed to the seatback at a side of the seat and a second airbag fixed to the seat bottom at the side of the seat, the first and second airbags each inflatable to an inflated position; and
- the second airbag in the inflated position overlapping the first airbag in the inflated position in a seat-rearward direction;
- wherein the seatback includes a bottom at the seat bottom and a top spaced from the bottom, the first airbag is disposed closer to the bottom than the top of the seatback;
- wherein the seat bottom includes a back end at the seatback and a front end spaced from the back end in the seat-forward direction, the second airbag is disposed closer to the back end than the front end of the seat bottom.

20. The restraint system of claim 19, wherein the seat has an occupant seating area, the first and second airbags are disposed outboard of the occupant seating area relative to the seat.

* * * * *